United States Patent [19]

Mocenter et al.

[11] 4,377,744
[45] Mar. 22, 1983

[54] REMOTE LENS FOCUSING SYSTEM FOR AN AERIAL CAMERA

[75] Inventors: Michael E. Mocenter, Erdenheim; Harry F. Koper, Warminster, both of Pa.

[73] Assignee: The United States of America as represented by the Secretary of the Navy, Washington, D.C.

[21] Appl. No.: 168,854

[22] Filed: Jul. 14, 1980

[51] Int. Cl.$^3$ .............................................. G01D 5/34
[52] U.S. Cl. ............................... 250/231 SE; 318/602
[58] Field of Search ................. 250/201, 204, 231 SE; 318/602; 354/25

[56] References Cited

U.S. PATENT DOCUMENTS

| | | | |
|---|---|---|---|
| 3,670,228 | 6/1972 | Crosby | 318/602 |
| 4,078,171 | 3/1978 | Stauffer | 354/25 |
| 4,090,069 | 5/1978 | Lisfeld et al. | 250/201 |
| 4,109,188 | 8/1978 | Shima et al. | 318/602 |
| 4,251,144 | 2/1981 | Matsuda et al. | 250/201 |

Primary Examiner—David C. Nelms
Attorney, Agent, or Firm—R. S. Sciascia; Henry Hansen

[57] ABSTRACT

A system for remotely controlled focusing of a reconnaisance camera installed on an aircraft. The camera can be focused to any of a plurality of pre-selected focused position, each position having a unique corresponding binary coded decimal designator generated from a position correlated switch. When a change in focus is selected by depression of a push button switch, the resulting binary coded decimal designator for the desired focus position is added to the binary coded decimal designator from the optical switch. Differences between the two designators will cause a scanner to rotate and scan all optical switches, while simultaneously a gear mechanism adjusts the camera lens focus position to the position corresponding to that for the switch scan at that increment of time. When the scanner locates the activated switch whose binary coded decimal designator is the same as the designator of the selected pushbutton, scanning and focusing adjustments are halted.

7 Claims, 4 Drawing Figures

REMOTE LENS FOCUSING SYSTEM FOR AN AERIAL CAMERA

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a remote lens focusing control system for an airborne reconnaissance camera and, more particularly for a digital lens focusing control system.

Navy patrol aircraft were originally outfitted with a six inch focal length camera. The camera was suited for the requirements set by the Navy at that time, however, as requirements changed the six inch focal length camera was replaced with an 18 inch focal length camera. This camera provided the long range patrol aircraft with various standoff photographic ranges. However, the lens was designed with a manual focus control and could not be focused during a flight but had to be focused to a desired range prior to flight. After some flights, the necessity for a remote refocusing control system became apparent.

Certain of the focusing systems in the prior art adjust the focus of the lens to an object distance corresponding to the distance of the camera to a remote subject in a field of view of that lens. Specifically, these focusing systems utilize image correlation in which optical systems are scanned by a sensor and the images therefrom then correlated electrically utilizing analog techniques. The output from an analog system normally controls a motor which drives a focusing cell of an objective lens so as to yield focusing when the two images are coincident. Essentially the focusing systems in the art for still and movie cameras are accomplished by controlling through analog means the position of an objective lens system in accordance with a photoelectrically sensed distance from the camera to an object which is to be photographed. An analog system has the inherent disadvantages of being susceptible to heat, noise, shock and vibration. These negative features are particularly bothersome on an aircraft where there are a multiplicity of electrical noises, a potential for high shock forces and abnormal ambient vibration levels.

SUMMARY OF THE INVENTION

Accordingly, an object of the present invention is to provide greater mission flexibility for the Navy's patrol aircraft performing photographic reconnaisance mission. Another object of the invention is to permit the mission commander to fly his aircraft at various standoff distances while photographing targets of interest. Yet another object of the invention is to provide remote focusing while in flight so as to meet changes in operational tasking after the focus has been set. A further objective of the invention is to provide a camera which is able to obtain a picture of the complete target in one frame of photography and yet another picture which will provide the maximum amount of ground resolution of the target. It is another object of this invention to provide a focusing of an aerial camera from a remote position. Still another further object of the invention is to provide a remotely focused lens system which requires less power, is more accurate, costs less, is resistive to shock, does not chatter when moved to a new position and does not have drift and noise problems. It is a still further object of the present invention to provide a remotely focused lens system whose new position is precisely sensed for positive feedback to a command station.

According to the present invention, a reconnaisance camera is remotely focused by a binary coded decimal control system. This is accomplished through a combination of electronics and mechanics. The camera is focused to any of a plurality of preselected focus positions which is related to a preset standoff distance from which a long range patrol aircraft may photograph targets of interest. Change of focusing is accomplished by depression of a push button switch which permits a particular optical switch to be activated until it senses a unique binary coded decimal designator. A rotating scanner scans all the optical switches simultaneously with the camera lens adjustment. A gear mechanism adjusts the camera lens focused position to the position corresponding to that where the switch scan is at that increment of time. When the scanner activates the located switch, scanning the focus adjustments are halted.

Other objects, advantages, and novel features of the invention will become apparent from the following detailed description of the invention when considered in conjunction with the accompanying drawings wherein:

BRIEF DESCRIPTION OF THE DRAWINGS

FIG. 4 is a schematic representation in elevation of a patrol aircraft utilizing the remoted controlled digital focusing control system.

DESCRIPTION OF A PREFERRED EMBODIMENT

Figure 1:
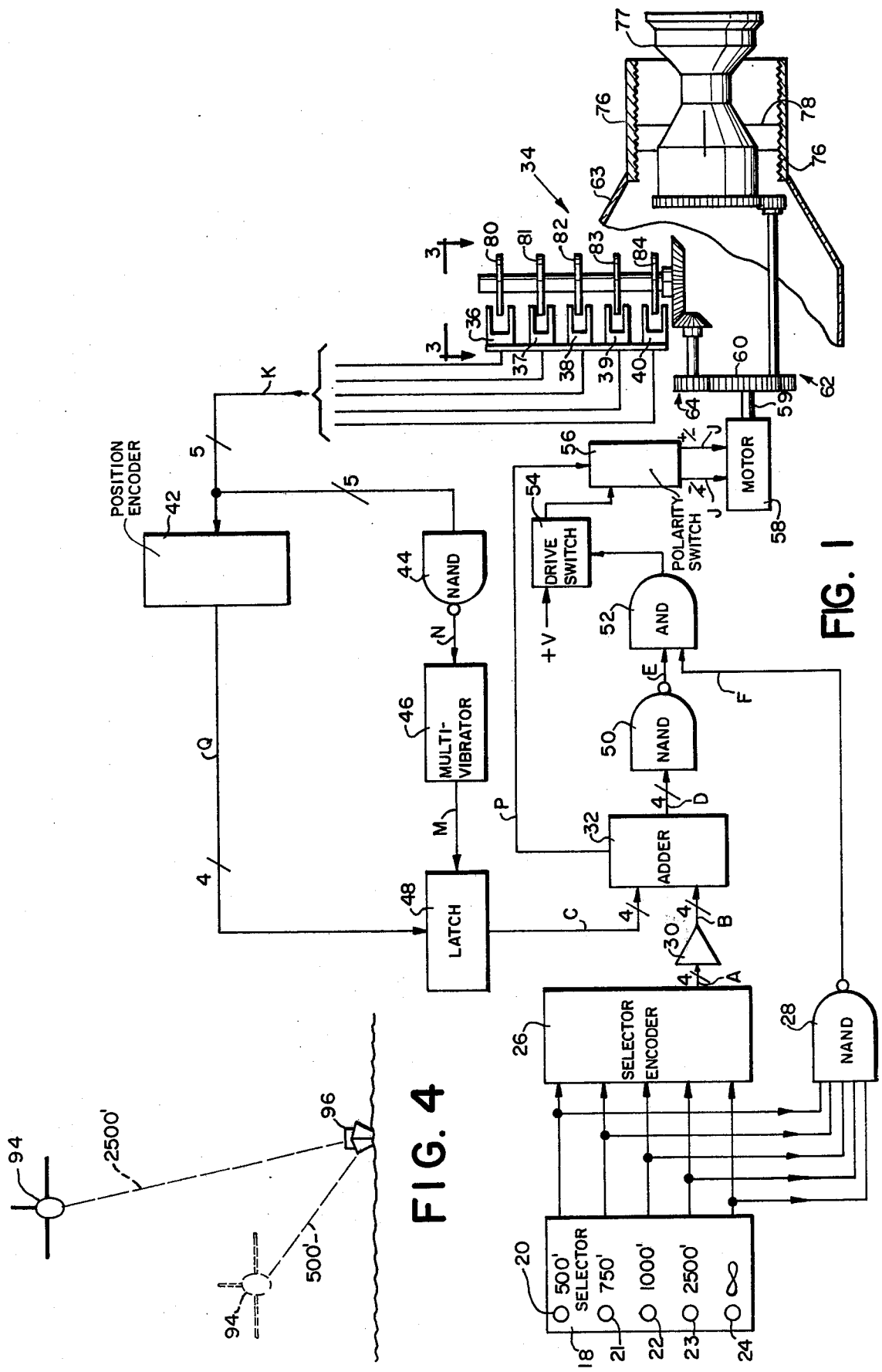
FIG. 1 is an electrical and mechanical schematic diagram of a remote controlled digital focusing control system according to the invention.
Figure 2:
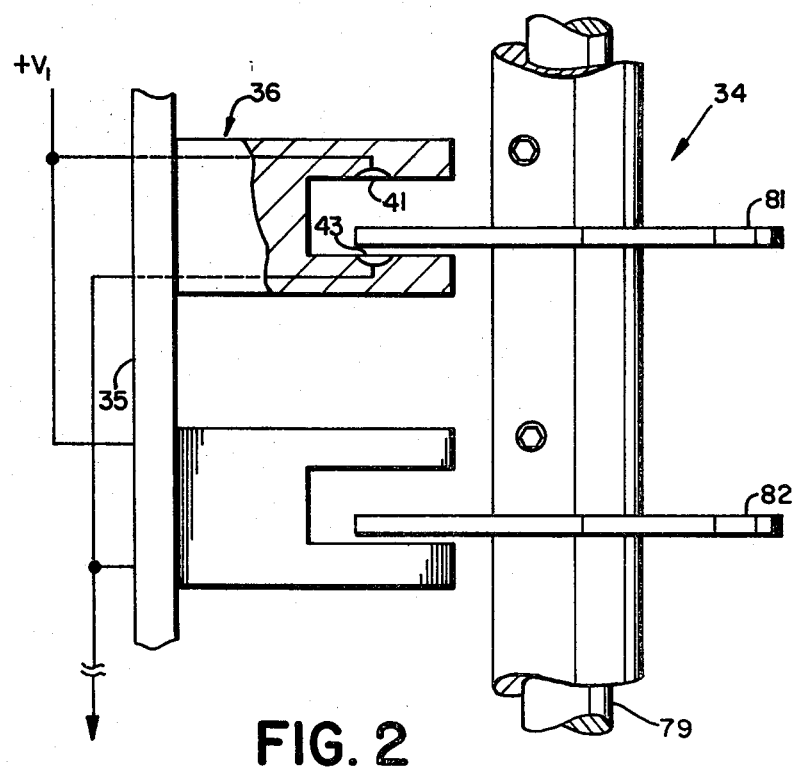
FIG. 2 is an enlarged fragmentary view of the electro-optical position sensor of the system of FIG. 1.

Referring now to the drawings, wherein like reference characters designate like or corresponding parts throughout the several views, there is shown in FIG. 1 a remote controlled digital focusing control system for an airborne reconnaisance camera. Slant range selection module 18 is normally located in the cockpit of an aircraft. Module 18 contains a plurality of push button switches 20-24. When the switches are not activated, a high signal is fed through each switch to the respective inputs of a decimal-to-binary encoder 26. For each input to encoder 26 a respective four-bit-binary-coded-decimal (BCD) word A is fed from encoder 26 to an inverter 30. The possible digital words which may be fed from encoder 26 as a result of the input from module 18 are shown in Table I as follows:

TABLE I

| SLANT RANGE FT. | DECIMAL INPUT TO ENCODER 26* | BCD OUTPUT FROM ENCODER 26* A | INVERTED BCD OUTPUT FROM INVERTER 30* B |
|---|---|---|---|
| 0 | H H H H H | H H H H | L L L L |
| 500 | L H H H H | H H H L | L L L H |
| 750 | X L H H H | H H L H | L L H L |
| 1000 | X X L H H | H H L L | L L H H |
| 2500 | X X X L H | H L H H | L H L L |

TABLE I-continued

| SLANT RANGE FT. | DECIMAL INPUT TO ENCODER 26* | BCD OUTPUT FROM ENCODER 26* A | INVERTED BCD OUTPUT FROM INVERTER 30* B |
|---|---|---|---|
| INF. | X X X X L | H L H L | L H L H |

*H = high logic level, L = low logic level, X = irrelevant

The output B of inverter 30 is fed into one input of a four-bit binary full adder 32 which adds with another input consisting of another four bit binary word. The other input C is generated by an electro-optical position sensor switch assembly 34 as described herein below. When both inputs are uniquely opposite the summer outputs D of adder 32 will be all H's (high logic levels). When the output D results in all H's an L (low logic level) will appear at the output E of a NAND gate 50 which is fed to one input of an AND gate 52. The other input F of AND gate 52 is fed from a selection input protection NAND gate 28. An L from NAND 28 will inhibit AND gate 52 whereas H from NAND 28 will permit AND gate 52 to provide a control signal output G. An H fed from AND gate 52 activates a motor drive switch 54 which in turn feeds a voltage V+ to a polarity changing switch 56. Four bit binary full adder 32 carry output P is also fed to polarity changing switch 56. An H at carry output P of adder 32 sets the polarity changing switch 56 to as to rotate a lens positioning motor 58 in the clockwise direction. Accordingly a carry bit which remains at L causes switch 56 to feed its output J to a lens positioning motor 58 so as to rotate motor 58 in a counter-clockwise direction. Motor 58 and pinion 60 rotates a lens 77 through gear train 62 so as to change its position forward or backward within a lens mounting assembly 63 which includes internal threads 76 engaging lens barrel threads 78. Pinion 60 simultaneously meshes with and drives a second gear train 64, thereby rotating a disc supporting shaft 79 of an electro-optical position sensor switch assembly 34.

Figure 3:
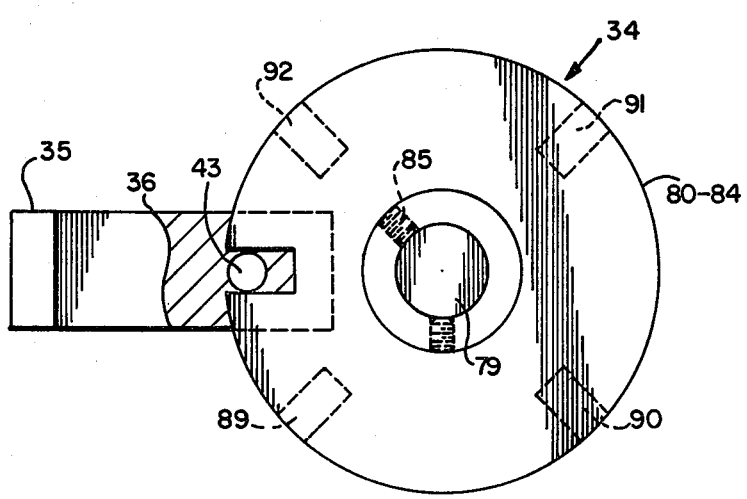
FIG. 3 is an end view of the position sensor taken along the line 3—3 of FIG. 1.

As seen best in FIG. 3, the gears are selected to limit disc rotation to not more than 360° for total slant range adjustment. Shaft 79 supports a stack of encoder discs 80–84 each of which has a rectangular, slit 88–92, respectively, cut into it. The purpose for each slit is to permit light to be transmitted through the disc when the slit is in a pre-calibrated angular position. Each disc is connected and aligned on shaft 79 and held in position by two set screws 85 in a sleeve section of the disc. The discs 80–84 are rotated on the shaft 79 and rightened in a calibrated position by screws 85, so as to yield from assembly 34 the proper four bit digital word in correlation with a pre-calibrated position of the lens 77. Each slit 88–92 is angularly offset so as to allow light to pass through the respective disc 80–84 in correlation with a pre-calibrated position of lens 77. Discs 80–84 work in conjunction with optical switches 36–40, respectively, which are aligned on a support 35 to register with slits 88–92. Switches 36–40 generate either an H or L at output K as a function of light path interruption between a light emitter 41 and light receiver 43 by discs 80–84 to form a decimal value for each of the angular positions thereof corresponding to encoder 26 input of Table I. Output K is fed to a decimal-to-BCD encoder 42 which transposes the decimal value to a four-bit binary coded decimal output Q corresponding to encoder 26 output A. The output Q is fed to a latch 48 which transfers output Q to adder 32 when it is pulsed by a trigger output M from a monostable multivibrator 46. Adder 32 adds the four-bit binary word, input C, from latch 48 with the four-bit binary word, output B, from inverter 30.

As switch assembly 34 feeds output K to encoder 42 it simultaneously feeds to optical position sense movement NAND gate 44. NAND gate 44 outputs an H at output N whenever at least one L is fed to it. Monostable multivibrator 46 receives the H at output N from NAND 44 and feeds output M to latch 48 thereby permitting transfer of its input to adder 32.

In summary, operation of the present invention is explained with reference to a typical scenario as depicted in FIG. 4. An aircraft 94 is shown making two passes by a target vessel 96. Each pass is made at one of the slant range selection options of the module 18. As the aircraft 94 approaches the bow of the vessel 96 during the first pass, for example at a slant range of 2500 feet, the pilot effectuates the proper focusing by depressing switch 23. This provides an input to encoder 26 which outputs a four-bit digital word A corresponding to 2500 feet, Table I. Word A is fed to inverter 30 which inverts the H's into L's and the L's into H's and feeds output B to adder 32. Assuming that the operator has previously depressed the 500 feet switch, at the other input of adder 32, there is a different four-bit binary word C. The addition of the two inputs will not yield all H's at the output D and will cause motor 58 to turn in a direction depending upon the polarity of the voltage being fed from switch 56. Therefore, the rotation of motor 58 rotates lens 77 to screw it forward or backward in lens mounting mechanism 63. Simultaneously, discs 80–84 rotate within the paths of light of optical switches 36–40. At predetermined angular intervals, as a function of the calibrated positioning of slits 88–92, the light will be permitted to pass and generate output K. Output K is fed back to adder 32 in the form of output C. When the outputs on B and C are uniquely opposite, motor 58 will not receive voltage +V and therefore will not turn. Lens 77 is in the proper focusing position for the slant range of 2500 feet selected by the pilot when switch 23 was depressed.

If the pilot wishes to photograph vessel 96 from another slant range for example 500 feet he may refocus lens 77 simply by depressing switch 20. The sequence of circuit actions will occur as previously explained and will result in motor 58 repositioning lens 77 for the selected slant range of 500 feet.

It should be apparent that the invention as described hereinabove provides the accuracy, reliability and precission of digital circuitry to remotely focus a reconnaisance camera during normal flight operations. The system permits an aircraft commander to obtain various pictures of a target vessel from different slant ranges without the necessity of landing the plane to refocus the lens as was previously required. The system as described uses less power, is more shock resistant and does not exhibit the noise and drift problems usually encountered in analog systems.

While the foregoing description and drawings represent the preferred embodiment of the present invention, it will be obvious to those skilled in the art that various changes and modifications may be made therein without departing from the true spirit and scope of the present invention.

What is claimed is:

1. A remote lens focusing system comprising:

a positionable lens for incrementally varying the focal length thereof;

selector means having a plurality of switches each producing a first decimal number signal indicative of a selected slant range, a first encoder connected to receive and convert the first number signal into a first binary coded signal, an inverter connected to receive and invert the first coded signal into an inverted coded signal;

sensor means connected to said lens for producing a stored binary coded signal indicative of the incremental focal length;

controller means having a binary full adder connected to receive and add the inverted and stored coded signals for producing a binary coded sum signal indicative of a difference between the selected range and said lens focal length and a carry signal indicative of a rotational direction command for positioning of said lens, a first NAND gate connected to receive the coded sum signal for providing a one-bit sum signal indicative of a difference between the selected range and the lens focal length, a second NAND gate connected to receive the first number signal for producing an inhibit signal indicative of the absence of range selection, an AND gate connected to receive the one-bit sum signal and inhibit signal for producing a drive signal indicative of a valid change position command; and motor means connected to receive the drive signal and carry signal and operatively connected to said lens for providing positioning thereof.

2. The system of claim 1 wherein said sensor means further comprises:

an electro-optical position sensor coupled to said lens for producing a second decimal number signal indicative of the focal length;

a second encoder connected to receive the second number signal for producing a second binary coded signal;

transfer means connected to receive the second number signal for producing a pulse on occurrence thereof; and a bistable latch connected to receive the pulse and the second coded signal for providing the stored binary coded signal to said controller means.

3. The system of claim 2 wherein said electro-optical position sensor further comprises:

a plurality of optical switches for producing the second number signal; and a plurality of rotatable discs operatively connected to said lens each including a slit registerable with one of said optical switches.

4. The system of claim 3 wherein each of said optical switches includes a light emitter and a light receiver on opposite sides of respective ones of said discs.

5. The system of claim 4 wherein said rotatable discs are coaxially mounted on a rotatable shaft coupled to said lens, each including a sleeve and opaque annular plate rotatable between said emitter and said receiver with said slit positioned for one of said incremental focal lengths.

6. The system of claim 2 wherein said transfer means further comprises:

a third NAND gate connected to receive said second number signal for producing a trigger signal when at least one bit of said second number is low; and a monostable multivibrator connected to receive the trigger signal for providing the pulse to said latch.

7. The system of claim 1 wherein said motor means further comprises:

a motor drive switch connected to receive the drive signal for producing a motor drive voltage in response thereto;

a polarity changing switch connected to receive said motor drive voltage and the carry signal for providing a directional drive voltage; and a lens positioning motor connected to receive said directional drive voltage and having its output coupled to said lens.

* * * * *